(12) United States Patent
Sanghvi et al.

(10) Patent No.: US 9,286,368 B2
(45) Date of Patent: Mar. 15, 2016

(54) LINKING FRAMEWORK FOR INFORMATION TECHNOLOGY MANAGEMENT

(75) Inventors: Ashvinkumar J. Sanghvi, Sammamish, WA (US); Giedrius Zizys, Redmond, WA (US); Bahadir Baris Onalan, Bellevue, WA (US); Robert T. Hutchison, Snoqualmie, WA (US); Pritam K. Sharma, Sammamish, WA (US); David W. Ge, Kirkland, WA (US); Michael T. Roth, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 151 days.

(21) Appl. No.: 13/466,123

(22) Filed: May 8, 2012

(65) Prior Publication Data

US 2012/0221605 A1    Aug. 30, 2012

Related U.S. Application Data

(63) Continuation of application No. 11/933,217, filed on Oct. 31, 2007, now Pat. No. 8,190,562.

(51) Int. Cl.
*G06F 7/00* (2006.01)
*G06F 17/00* (2006.01)
*G06F 17/30* (2006.01)

(52) U.S. Cl.
CPC ............................... *G06F 17/30578* (2013.01)

(58) Field of Classification Search
CPC . G06F 2216/03; G06F 17/27; G06F 17/2785; G06F 17/30289; G06F 17/30507; G06F 17/30566; G06F 17/30705
See application file for complete search history.

(56) References Cited

U.S. PATENT DOCUMENTS

| | | | |
|---|---|---|---|
| 6,014,670 A | 1/2000 | Zamanian et al. | 707/101 |
| 6,411,961 B1 | 6/2002 | Chen | |
| 6,839,724 B2 | 1/2005 | Manchanda | |
| 6,934,687 B1 | 8/2005 | Papierniak | |
| 6,996,589 B1 | 2/2006 | Jayaram et al. | 707/204 |
| 7,003,560 B1 | 2/2006 | Mullen | |
| 7,146,499 B2 | 12/2006 | Yellepeddy | |

(Continued)

FOREIGN PATENT DOCUMENTS

WO    WO2007036932    5/2007

OTHER PUBLICATIONS

Qiming Chen,"A Data-Warehouse / OLAP Framework for Scalable Telecommunication Tandem Traffic Analysis", 16th International Conference on Data Engineering (ICDE'00), Feb. 2000.

(Continued)

*Primary Examiner* — Tuan A Pham
(74) *Attorney, Agent, or Firm* — Kate Drakos; Henry Gabryjelski; Micky Minhas

(57) ABSTRACT

A data synchronization task is received at a console, wherein the data synchronization task is associated with information technology management. A configuration document is configured using the data synchronization task, wherein the configuration document defines data synchronization through declarations. A linking framework is configured based on the configuration document. Data is synchronized from a first and second source to a target as defined by the configuration document.

15 Claims, 12 Drawing Sheets

(56) References Cited

U.S. PATENT DOCUMENTS

| | | | |
|---|---|---|---|
| 7,280,996 B2* | 10/2007 | Hayakawa et al. | 707/621 |
| 7,657,578 B1 | 2/2010 | Karr | |
| 2002/0116435 A1 | 8/2002 | Chen | |
| 2002/0133368 A1 | 9/2002 | Strutt | |
| 2003/0131025 A1 | 7/2003 | Zondervan et al. | 707/200 |
| 2003/0172010 A1* | 9/2003 | Butani et al. | 705/29 |
| 2003/0217069 A1 | 11/2003 | Fagin et al. | 707/102 |
| 2004/0078571 A1 | 4/2004 | Haverinen | |
| 2004/0225632 A1 | 11/2004 | Benson et al. | 707/1 |
| 2005/0166143 A1 | 7/2005 | Howell | 715/523 |
| 2005/0198299 A1* | 9/2005 | Beck et al. | 709/226 |
| 2005/0198611 A1 | 9/2005 | Ebert | |
| 2005/0223163 A1 | 10/2005 | Ogasawara | |
| 2005/0278458 A1 | 12/2005 | Berger et al. | 709/248 |
| 2005/0289198 A1 | 12/2005 | Todd | |
| 2006/0004875 A1* | 1/2006 | Baron et al. | 707/200 |
| 2006/0064666 A1 | 3/2006 | Amaru et al. | 717/100 |
| 2006/0069717 A1* | 3/2006 | Mamou | G06Q 10/10 709/203 |
| 2006/0095373 A1* | 5/2006 | Venkatasubramanian et al. | 705/40 |
| 2006/0112109 A1 | 5/2006 | Chowdhary | |
| 2006/0200499 A1 | 9/2006 | Bhatia et al. | 707/200 |
| 2006/0218159 A1 | 9/2006 | Murphy | |
| 2006/0248262 A1 | 11/2006 | Lin | |
| 2006/0294153 A1 | 12/2006 | Kumar | |
| 2007/0100834 A1 | 5/2007 | Landry et al. | 707/10 |
| 2007/0198331 A1* | 8/2007 | Hurley et al. | 705/11 |
| 2007/0203939 A1* | 8/2007 | McArdle | 707/102 |
| 2007/0220022 A1 | 9/2007 | Lankinen et al. | 707/101 |
| 2007/0225949 A1* | 9/2007 | Sundararajan et al. | 703/2 |
| 2007/0226049 A1* | 9/2007 | Muralitharan et al. | 705/11 |
| 2008/0215586 A1 | 9/2008 | Pruet | |
| 2008/0270490 A1* | 10/2008 | Watterott | G06F 17/30557 |

OTHER PUBLICATIONS

Fábio Rilston, "Enhancing Data Warehouse Design with the NFR Framework", Workshop em Engenharia de Requisitos, Valencía, Espanha, Nov. 2002.

Matthias Jarke, "Data Warehouse Quality: A Review of the DWQ Project", Proceedings 2nd International Conference on Information Quality (IQ-97), Cambridge, Mass., Oct. 1997.

Platt, ".Net Interop: Get Ready for Microsoft .Net by Using Wrappers to Interact with COM-based applications", Aug. 2001, MSDN Magazine, pp. 1-10.

* cited by examiner

550
CONFIGURATION WORKFLOW

600
LINK DOCUMENT STATE DIAGRAM

LINKING FRAMEWORK FOR INFORMATION TECHNOLOGY MANAGEMENT

RELATED CASE(S)

This Application is a continuation of and claims benefit from U.S. patent application Ser. No. 11/933,217 that was filed on Oct. 31, 2007 and that is incorporated herein by reference in it entirety.

BACKGROUND

Many problem domains, especially Information Technology (IT) management, have to deal with synchronizing and linking data residing in multiple stores. In IT management, a general solution has been to put IT management related data in a Data Warehouse (DW) and a Configuration Management Database (CMDB). However, the problem of integrating multiple data sources to a CMDB (or a data warehouse) has been typically left to the customer (e.g., system administrators). Today's IT management solutions fail to provide a general purpose, extensible mechanism for data integration.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention are directed to a linking framework for data synchronization. Synchronization processes are created and managed using declarative documents (such as objects) instead of manual coding or scripting. Embodiments of the linking framework provide data transformation, joining, and automated conflict resolution for data synchronization tasks.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Figure 1:
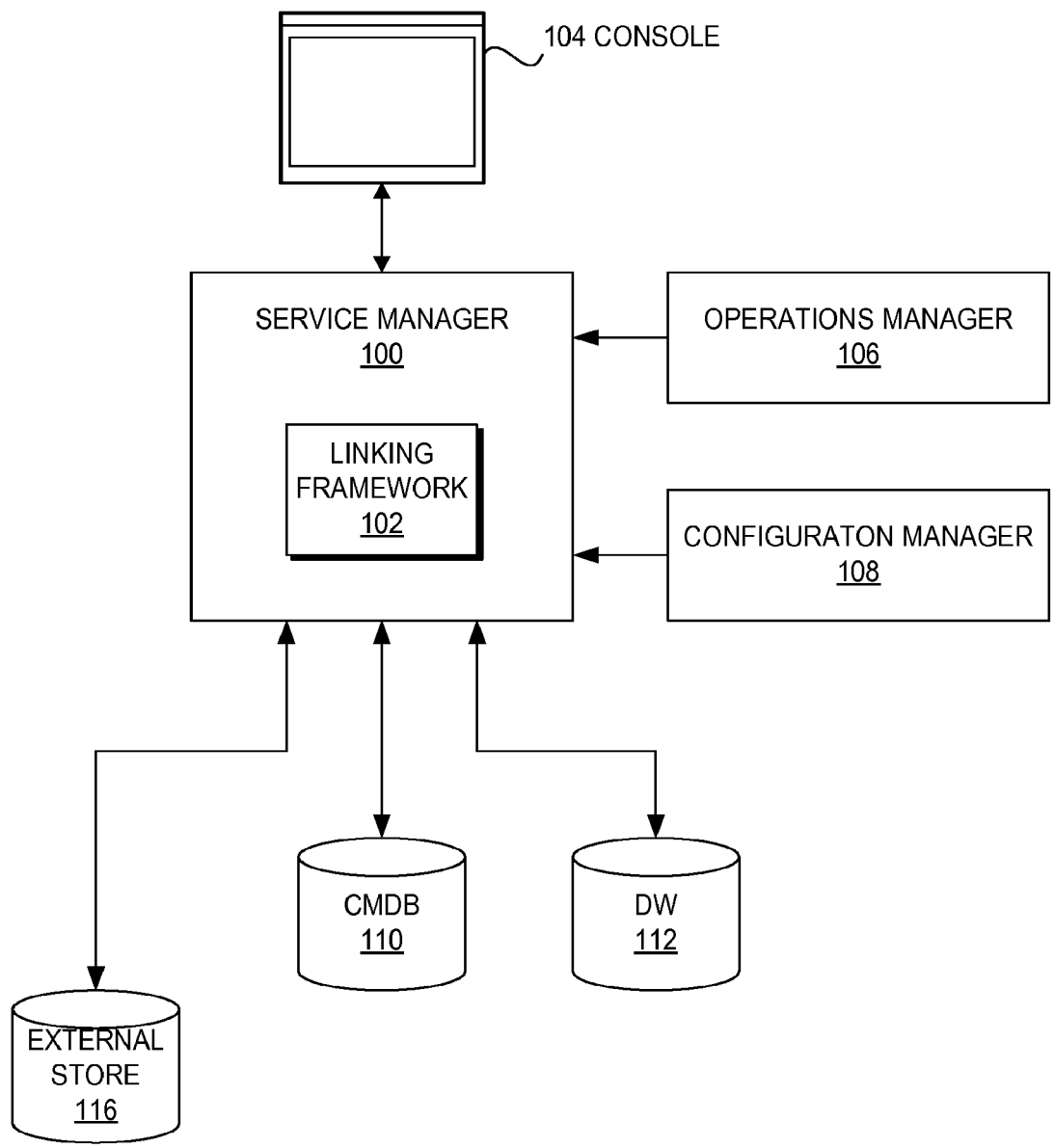
FIG. 1 is a block diagram of an operating environment for a linking framework in accordance with an embodiment of the invention.

FIG. 1 shows a service manager 100 including a linking framework 102 in accordance with an embodiment of the invention. In one embodiment, one or more components of service manager 100 and/or linking framework 102 may be implemented by computer readable instructions executable by one or more computing devices. An example computing device is discussed below in conjunction with FIG. 11.

Embodiments of linking framework 102 may be uses in various data synchronization scenarios. Data may become isolated (sometimes referred to as data islands) and needs to be consolidated or federated with other data stores. There are situations where data needs to be synched into a CMDB or data warehouse. At the same time, there are objects in the CMDB which are configured via people processes (like policies) that need to be synched out to the configuration and deployment systems. Also, there are situations where objects between two foreign stores or instances of CMDBs need to be federated.

Service manager 100 may be part of an organization's IT management system, such as Microsoft® System Center, to enable an organization to manage its computing resources. Management systems may perform activities such as monitoring of deployed hardware and software, automate processes such as software installation and updates, logging, reporting, and error handling and diagnosis. Service manager 100 provides a centralized point for service requests, knowledge, and workflow for processes such as incident reporting, problem handling, change requests, and asset management.

Linking framework 102 provides integration of data related to the management of computing resources. Linking framework 102 provides functionality such as transformation, conflict resolution, joins, and pre and post processing, watermark tracking, batching and concurrency across multiple servers for load balancing and performance. The behavior of linking framework 102 is driven by configuration documents (in one embodiment, implemented as configuration objects). All a user has to do is manipulate the configuration documents to affect a change in the data integration tasks of the linking framework. The declarative nature of the configuration documents releases the user from the burden of coding (or scripting) all the various data integration activities.

A user may interact with service manager 100 using a console 104 to create and/or modify a data synchronization task. In one embodiment, a user may manipulate a form on console 104 to generate or modify configuration documents for use with linking framework 102. A user, such as a system administrator, may enact data integration activities without having to perform actual coding. The administrator simply fills in a form on console 104 that in turn is used to configure the associated configuration documents. Code to support the configuration documents may be pulled from a linking framework library store, such as a Service Manager (SM) store, and executed by linking framework 102.

Service manager 100 may be connected to operations manager 106. Operations manager 106 provides monitoring and management of an organization's computing environment, such as error handling and reporting services. In one embodiment, operations manager 106 includes a Microsoft® System Center Operations Manager.

Service manager 100 may be connected to configuration manager 108. Configuration manager 108 handles asset deployment (hardware and/or software) and updating. Configuration manager 108 may also provide configuration monitoring to ensure systems comply with desired configuration models and policies. Configuration manager 108 may also generate reports showing what operating systems, applications, and software updates are installed on an organization's machines. In one embodiment, configuration manager 108 includes a Microsoft® System Center Configuration Manager.

Service manager 100 may interact with Configuration Management Database (CMDB) 110, Data Warehouse (DW) 112, and one or more external stores 116. CMDB 110 stores information related to the organization's computing assets and the relationships between them. DW 112 stores historical information about the tasks performed by service manager 100. DW 112 may be used for reporting and analysis. External store 116 (also referred to as a foreign store) stores data associated with other system management software products besides service manager 100, operation manager 106, and configuration manager 108. For example, service manager 100 may be part of Microsoft® System Center while external store 116 stores data associated with an SAP® Corporation system management product.

Figure 2:
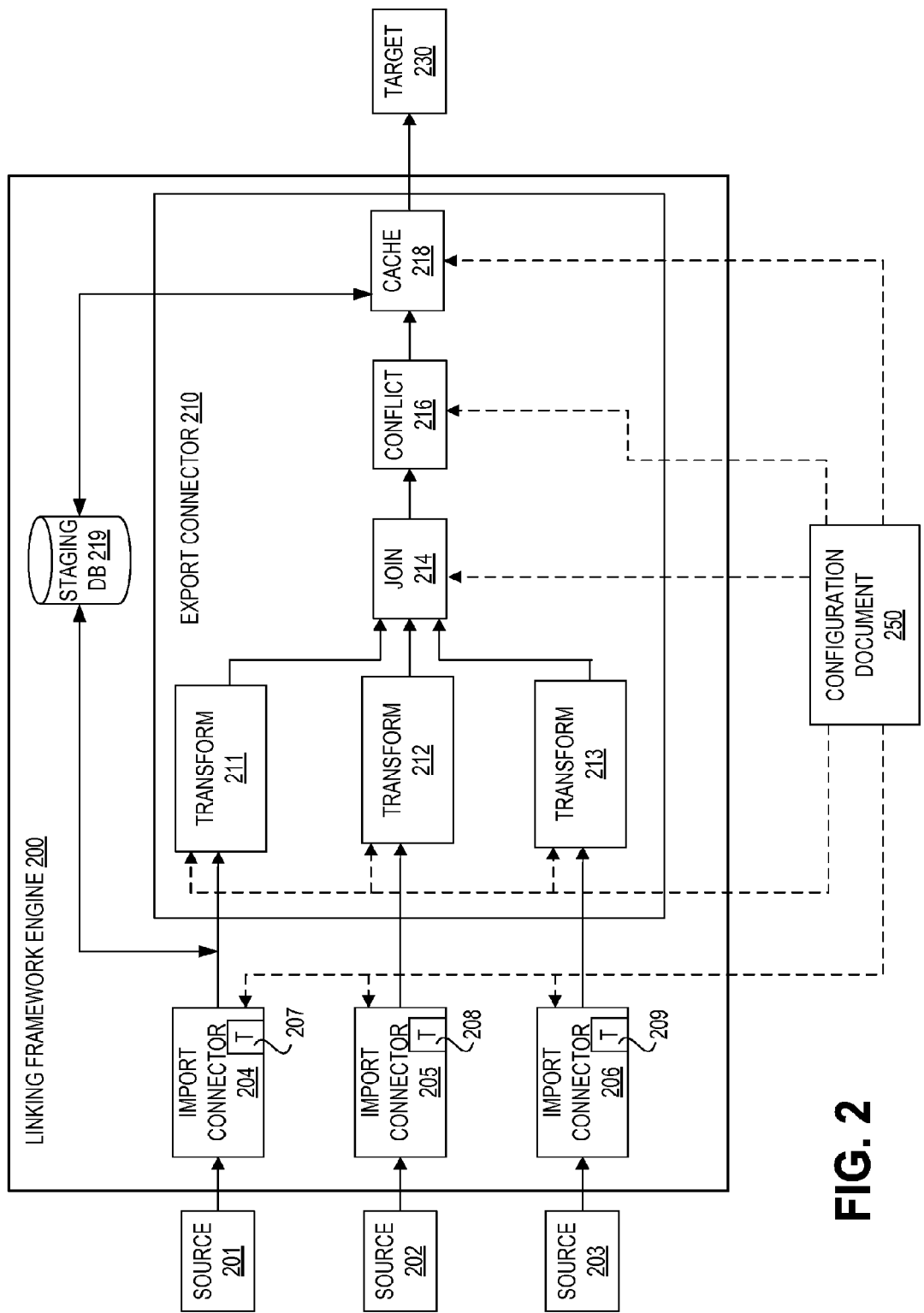
FIG. 2 is a block diagram of a linking framework engine in accordance with an embodiment of the invention.

Turning to FIG. 2, an embodiment of a linking framework engine 200 is shown. Linking framework engine 200 is an instance of linking framework 102. One or more components of linking framework engine 200 are configured by configuration document 250 (shown by a dotted line in FIG. 2). Configuration document 250 is generated by a configuration workflow (discussed below) in response to user input at console 104. It will be appreciated that multiple linking framework engines may be working at the same time to integrate data between one or more sources and one or more targets.

Linking framework engine 200 receives data from one or more sources. The embodiment of FIG. 2 shows sources 201, 202, and 203. Data from sources 201-203 is processed by linking framework engine 200 and the resulting data is saved to target 230. Sources may include operations manager 106, configuration manager 108, and external store 116. Target 230 may include CMDB 110 and DW 112. While the embodiment in FIG. 2 has three sources and one target, it will be appreciated that other embodiments may have alternative number of sources and targets.

Linking framework engine 200 may include import connectors 204-206 that receive data from sources 201-203, respectively. Each import connector 204-206 includes a trigger (triggers 207-209, respectively) that indicates when its connector is to pull data from its source. A trigger may initiate the requesting of data by its respective connector based on a time schedule, an event, or other factor. In one embodiment, the import connectors 204-206 use throttling when retrieving data to minimize impact on the sources.

Embodiments of the invention may initiate synchronization (i.e., a trigger) based on other factors besides a predetermined time schedule. Typically synchronizations occur on a schedule. However, sometimes one needs to synch on demand or on an event indicating an opportunity. Also, in some situations, it is most efficient to synch on a data change rather than on either a schedule or an event.

In one embodiment, location and globalization may be handled by connectors in linking framework 102. For example, linking framework 102 may treat all data as Unicode and simply pass it along between workflows, connectors and other components.

Data obtained by import connectors 204-206 is forwarded to export connector 210. In one embodiment, import connectors 204-206 drop off the data in a temporary storage (e.g., staging database 219) where export connector 210 may pickup the data. In another embodiment, staging database 219 may be used to store data pulled from a source when all the sources for a data synchronization are not available at the same time. For example, suppose source 201 is never available at the same time as sources 202-203 (e.g., due to access policies at sources, connectivity issues, permission/security issues, source machine down, etc.). In this case, import connector 204 may pull data when source 201 is available and put the data in staging database 219. When sources 202-203 are available, the data for the synchronization may be retrieved and also put in staging database 219. Now, all the data for the synch is ready for export connector 210 to process.

Export connector 210 may perform various processes (e.g., join, conflict resolution, etc.) on the data before storing the data to target 230. It will be appreciated that the embodiments of synchronization processing are not limited to the examples below, all of the examples are not necessarily used in all synchronization processing, and embodiments herein are not limited to the order of synchronization processing discussed below.

In the embodiment of FIG. 2, export connector 210 includes transform modules 211-213. A transform module transforms the data as needed for target 230. For example, data may be transformed from one schema used at source 201 to a different schema used at target 230.

Transform modules 211-213 may handle issues such as misaligned schemas that exist across stores. For example, as data is moved between external stores and a CMDB or data warehouse, the data needs to conform to a common schema. Since the external stores may not conform to the common schema in the CMDB or the data warehouse, transformations in the linking framework may be needed. In one embodiment of the invention, the data is transformed into a Service Manager Model Library schema.

Linking framework 102 may provide identity management of data. In some situations, the primary key for the same real world object (e.g., a computer) is different in different stores. For example, Microsoft® System Center Operations Manager recognizes a computer by Fully Qualified Domain Name (FQDN), Hewlett-Packard OpenView recognizes the same computer by Internet Protocol (IP) address and Microsoft® System Center Configuration Manager (SCCM) recognizes the same computer by a unique system hash.

In one embodiment of linking framework 102, the identity of each document may be embedded in the path/instance Uniform Resource Identifier (URI) of the document. The properties of a particular type may correspond to a primary key, and using those properties, a composite key may be constructed and used as the instance URI of the document during the transformation phase. In one embodiment, the same set of properties should be used for all the instances of a given type, and if the composite key later gets changed, then the previous instances should be properly disposed of and new ones created. Otherwise data could be duplicated and cause redundant operations in linking framework 102.

After the data passes through transform modules 211-213, the data may be joined using join module 214. In some cases, the representation of an object at target 230 is a join of multiple sources (i.e., multiplex). In another embodiment, the object at target 230 uses only a portion of a source object (i.e., demultiplex). Embodiments of the invention enable the joining of a variety of data. In some situations, properties of interest are expressed using different data types or ways that need table lookups or other data manipulations to arrive at the required shape. Sometimes the representation of an object in the destination is a join of multiple source objects, or vice versa.

In module 214 also supports cross service joins. In one embodiment, in a cross service join, two or more objects that need to be joined come from different stores that are in different, non-joinable forms and are available at different schedules. Join module 214 may be configured to wait for source data from different stores on different schedules so that a join may be conducted correctly.

In another embodiment, join 214 may occur before a transformation. For example, a line of data from a table in staging database 219 may be read at once, where the line of data includes data from multiple sources. The line of data is then transformed as defined in the configuration document.

Next at conflict module 216, any conflicts between the data from sources 201-203 are reconciled. Conflict module 216 provides automated resolution as well as error handling for irresolvable conflicts. For example, sometimes the same resulting object from two sources (or picked up at two times from the same source) is in conflict. If the source stores do not contain adequate information to accurately specify when a particular change has been done on entities, since the retrieval times from these sources may be different predetermined intervals set by the configuration of the linking framework, conflicts between multiple sources for the same instances would be impossible to reconcile accurately. Data times that conflict in such a way that no policy driven resolution can be applied may be parked in a file for later debugging, such as at staging database 219, while the linking framework continues with other items. Additionally, if the resulting data saved at target 230 does not make sense to a user, the user may use the linking framework to trace the data back to the source of the data and debug the problem at the source.

After conflict module 216, the data may be handled by cache module 218. The data is cached to local store, such as staging database 219. In one embodiment, the data is passed from cache module 218 to target 230 in a batch style. In one embodiment, this batching may be conducted in a manner to minimize impact on target 230. For example, the batching may be held until night when activity at target 230 is minimal. In another example, the passing of data to target 230 is throttled by cache module 218 to a level to prevent overwhelming target 230. Also, data persisted in a batch style enables cache module 218 to resume storing the data to target 230 after an interruption (e.g., network outage, power failure at target 230, etc.) without having to restart the data storing from the beginning.

Figure 3:
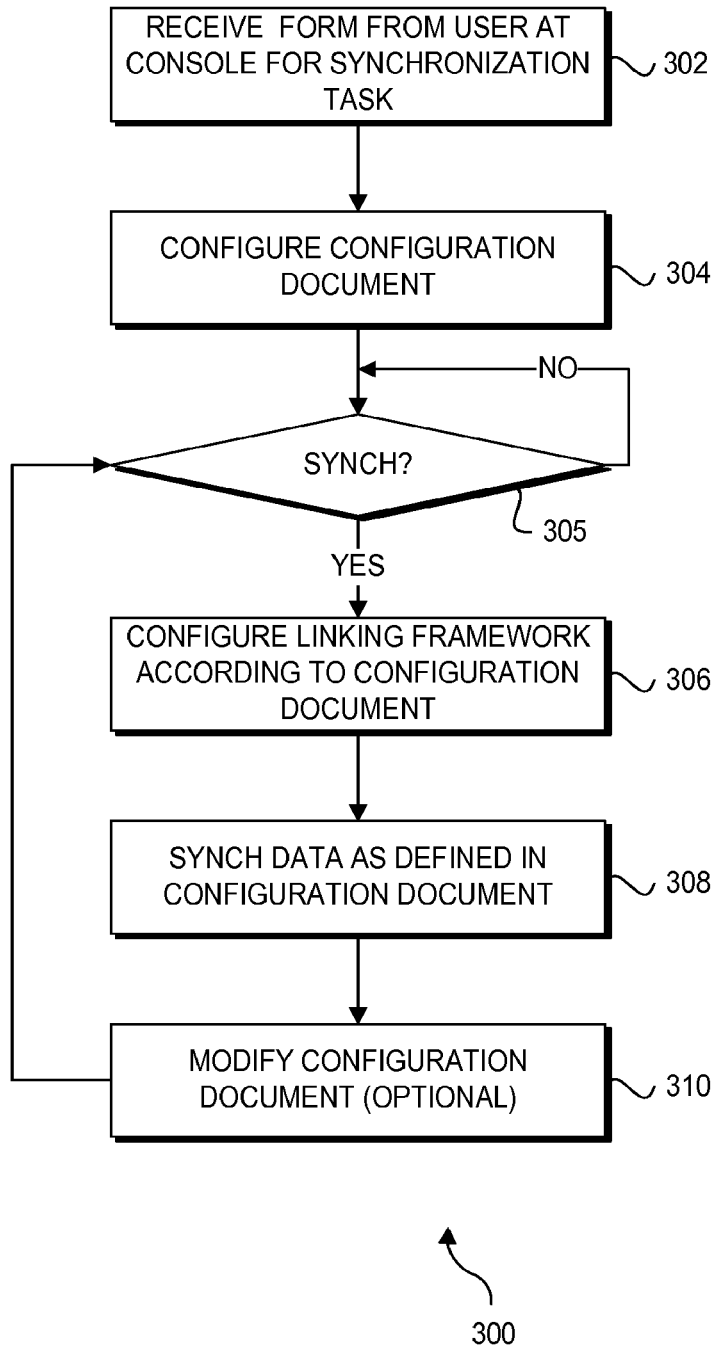
FIG. 3 is a flowchart showing the operations of a linking framework in accordance with an embodiment of the invention.

Turning to FIG. 3, a flowchart 300 shows operations of synchronizing data by a linking framework in accordance with an embodiment of the invention. In one embodiment, at least a portion of flowchart 300 may be implemented by computer readable instructions executable by one or more computing devices.

Starting with operation 302, a user fills in a form (e.g., a service request form) at a console for a synchronization task. The user may be creating a new activity or changing an existing activity. For example, to create a synchronization task, a system administrator merely identifies the source(s), the trigger(s) for the source(s) (e.g., a time schedule), the target(s), the data types, and the like. In one example, the system administrator may want to initiate a synchronization task because the system administrator would like to install software on a set of assets (e.g., clients) which are not known to service manager 100 (e.g., saved to CMDB 110 or DW 112) yet. In another example, the system administrator initiates a synchronization task because the analysts need information about certain assets that do not exist at service manager 100 (e.g., saved to CMDB 110 or DW 112) where the assets are involved in incidents the analysts are tracking.

Next, in operation 304, the synchronization task information in the form is used to configure a configuration document for the synchronization task. In another embodiment, the configuration document is implemented as a configuration object stored in CMDB 110. In one embodiment, code to implement the tasks defined in the configuration document is identified and referenced in the configuration document, such as a reference to a code library.

For example, the user does not have to code for an import connector or know how to connect to a source. The user declares the parameters of the import connector (e.g., source, data type, trigger, etc.) and the proper code to implement the connector is provided by the linking framework, such as from Service Manager (SM) store 403 discussed below.

Next, at operation 305, the linking framework waits for a synchronization to be triggered (e.g., by a scheduled time, an event, or other trigger) as defined by the configuration document. Once a synchronization is triggered, the logic continues to operation 306. It will be appreciated that multiple configuration documents may be active and have different synchronization triggers. A single configuration document is described in flowchart 300 for the sake of clarity.

Proceeding to operation 306, the linking framework is configured as defined by the configuration document. For example, import/export connectors are configured as described in the configuration document. Next, in operation 308, data is processed per the configuration document. For example, data is obtained from a source by import connectors and transformed, multiplexed/demultiplexed, and persisted to a target by export connectors as defined by the configuration document.

Continuing to operation 310, the configuration document is optionally modified. In one embodiment, the user may edit the configuration document using console 104. The user may edit various aspects including the source, the target, a trigger for an import connector, and the like. After operation 310, the logic returns to operation 305 to wait for a synchronization to be triggered in accordance with the modified configuration document.

Figure 4:
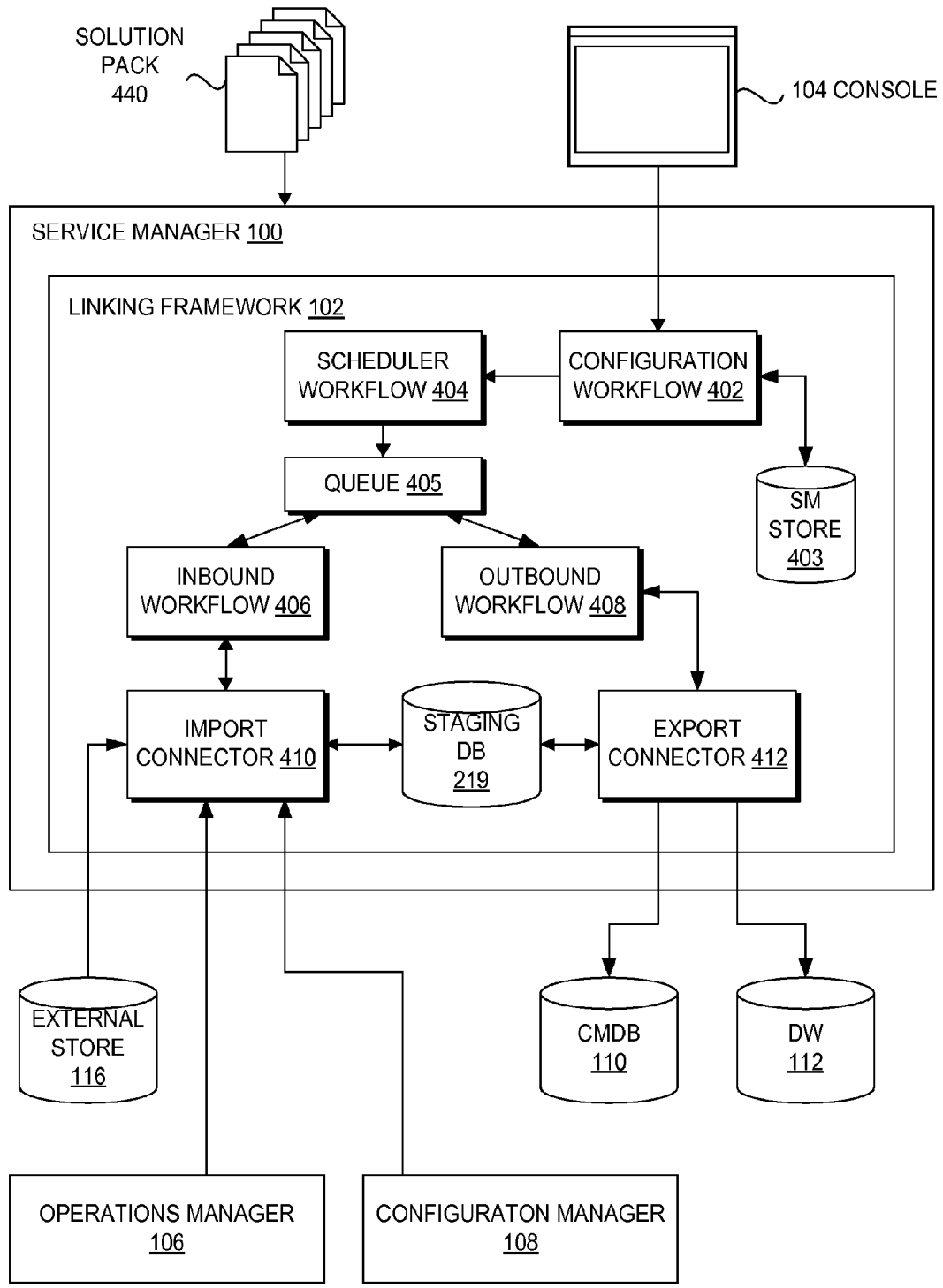
FIG. 4 is a block diagram of a linking framework in accordance with an embodiment of the invention.

Turning to FIG. 4, an embodiment of workflows for linking framework 102 is shown. In general, a workflow is a set of activities stored as a model that describes a real-world process. Work passes through the workflow models from start to finish and work activities can be executed by system functions (e.g., pulled from service manager store 403). A workflow provides a way of describing the order of execution and dependent relationships between pieces of work.

In FIG. 4, a user creates a synchronization task at console 104. In one embodiment, the user fills in a form indicating what activity the user wants done. The information entered by the user is received by configuration workflow 402. Configuration workflow 402 generates a configuration document based on the user's inputs. In one embodiment, code to implement the synchronization task defined in the configuration document is obtained from a code library, such as service manager store 403.

The configuration document is passed from configuration workflow 402 to scheduler workflow 404. Scheduler workflow 404 periodically (e.g., every 1 minute) looks for configuration documents created by configuration workflow 404. Scheduler workflow 404 determines whether the configuration document involves inbound workflows 406, outbound workflows 408, or both. Scheduler 404 then places messages in a queue 405 for inbound workflows 406 and/or outbound workflows 408. Scheduler workflow 404 places the messages in queue 405 when a trigger defined in the configuration document has been tripped to initiate the inbound/outbound workflow as appropriate. As will be discussed below, messages in queue 405 may be associated with different configuration documents. Inbound/outbound workflows 406 and 408 pull messages off the queue and handle data processing as defined by the configuration documents associated with the messages in queue 405.

Inbound workflow 406 configures an import connector 410 as defined by the configuration document associated with the message in queue 405. Import connector 410 may collect data from various sources including, but not limited to, operations manager 106, configuration manager 108, and one or more external stores 116.

After the source data is collected by the inbound workflow/import connector, the data may temporarily stored in staging database 219. The data may then be picked up from staging database 219, processed, and persisted to the target by the outbound workflow/export connector.

Outbound workflow 408 configures an export connector 412 as defined by the configuration document associated with message in queue 405. Export connector 412 may send data to various targets such as, but not limited to, CMDB 110 and DW 112.

In one embodiment, linking framework 102 may be extensible through a solution pack 440 received at service manager 100. Solution pack 440 includes resources to implement a particular aspect of information technology management. For example, solution pack 440 may include a new workflow (including supporting code to be stored at service manager store 403) and a group of forms for use with console 104 that allow a user to interact with that new workflow. In one embodiment, service manager 100 is shipped as a product that includes solution packs for the workflows as shown in FIG. 4.

It will be appreciated that inbound workflow 406, outbound workflow 408, import connector 410, and export connector 412 are configured by configuration documents to generate linking framework engines, such as described in connection with FIG. 2. One or more engines may be operation simultaneously as messages are handled by the inbound and outbound workflows. Messages may be associated with several different engines as the messages are processed by the inbound and outbound workflows. A linking framework engine is a logical construct of the linking framework at a point in time as the components of the linking framework are configured at that point in time.

Linking framework 102 includes two types of connectors: import connectors and export connectors. Connectors are components in linking framework 102 which communicate with external sources and targets. In one embodiment, connectors may be developed in any programming language as long as a Microsoft®.NET wrapped entry point class is provided. In this embodiment, connectors have no priority settings and all are treated the same.

Import connectors run under the application domain of inbound workflow 406. An inbound workflow 406 loads the specified connector mentioned in the configuration document, and calls the specified interface method.

Export connectors run under the application domain of outbound workflow 408. Export connectors are handed data from staging database 219 via the outbound workflow 408 and write the data into another system (i.e., the target).

In one embodiment, linking framework 102 includes two types of export connectors: a CMDB Connector and a DW Connector. In one embodiment, a CMDB connector writes the data into CMDB 110 after passing the data through an Extensible Stylesheet Language Transformations (XSLT) transformation. In one embodiment, this connector uses an "Upsert" method in the Data Access Layer (DAL) for the CMDB (SML runtime store), and leaves the decision to "Update" or "Insert" a particular instance in the service manager runtime store. In one embodiment, DAL provides a Merge method to be able to "merge" two documents, rather than updating a document in its entirety.

A DW Connector writes the data into DW 112 after passing the data through an XSLT transformation. In one embodiment, the data is stored in relational tables.

In one embodiment, export connectors differ from import connectors in that export connectors do not keep any state information nor persist any bookkeeping information. Export connectors work one batch of data at a time, and therefore, every time the outbound workflow loads an export connector, the outbound workflow invokes a "Configure" method for the export workflow to program itself to be ready to process the upcoming batch.

Figure 5A:
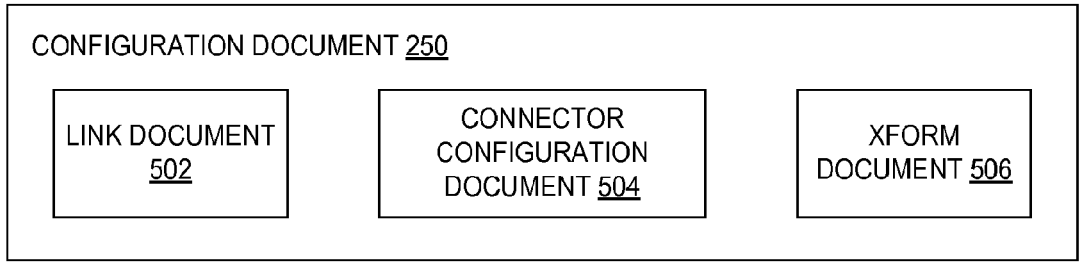
FIG. 5A is a block diagram of a configuration document in accordance with an embodiment of the invention.
Figure 5B:
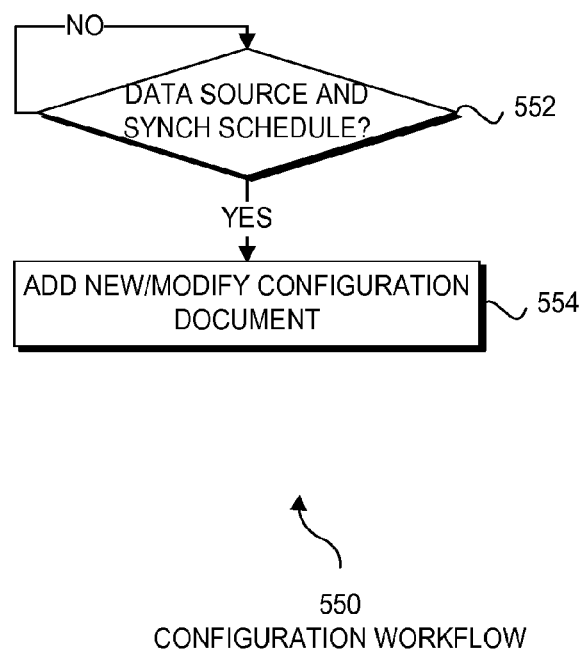
FIG. 5B is a flowchart showing the operations of a configuration workflow in accordance with an embodiment of the invention.

Turning to FIG. 5A, an embodiment of a configuration document 250 is shown. Configuration document 250 is generated by configuration workflow 402 and includes a link document 502, a connector configuration document 504, and a transformation (Xform) document 506. Configuration workflow 402 creates configuration documents from templates in service manager store 403. In flowchart 550 of FIG. 5B, configuration workflow 402 checks the existence of DataSource and SyncSchedule documents (operation 552). These documents are created and stored in service manager store 403 when a user creates/modifies a data synchronization configuration document at console 104. The DataSource document describes the endpoint address of the server from which the data transfer will be made from (i.e., the source). It also contains information about how to connect to this server, including the credentials to be used if necessary. The SyncSchedule document describes scheduling information for the data synchronization including the interval (e.g., hourly, daily, weekly, etc.).

When either the DataSource or SyncSchedule document are in the service manager store 403, configuration workflow 402 will be triggered to either add new linking framework configuration documents from preexisting template documents, or update existing configuration documents (operation 554). Template documents are configuration documents that do not have schedule information, data source information, collection information (for example, in the case of Microsoft® System Management Services), or other information used to synchronize data from source stores. This missing information is filled in with information from the DataSource and SyncSchedule documents.

Link document 502 includes information about the source and target and processing to be conducted during the synchronization (e.g., transformations, joins, conflict resolution policies, and batch scheduling). The type information, which connector configuration documents are involved in this synchronization, dependencies and state information are tracked in a link document along with other bookkeeping data like the number of concurrent batches and the batch size (i.e., amount of data in a single batch read/write).

Figure 6:
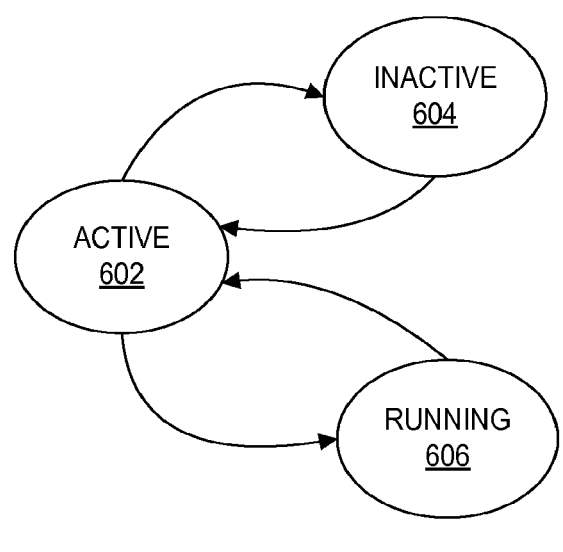
FIG. 6 is a state diagram of a link document in accordance with an embodiment of the invention.

FIG. 6 shows a state diagram 600 for a link document. Each Link document includes three states of Active 602, Inactive 604, and Running 606. Active state 602 indicates the link document is ready to be processed by the linking framework. Inactive state 604 indicates the link document does not need to be processed by the linking framework. And Running state 606 indicates the link document is currently being processed by the linking framework.

The link document can become Running, or inactive once it's Active. Link documents in state Running, can go back to being Active, but an Inactive document cannot go into a Running state without being Active first. Similarly a linking document which is in a Running state, has to go to an Active state before it can be set to Inactive.

A link document may be independent, or be dependent on one or more other link documents. When the dependencies are specified in a link document, then the synchronization will not start, even though the synchronization time has come and passed, unless the dependent link document(s) have completed their synchronization.

A link document may reference zero or more import connector, and/or zero or more export connector configuration documents (such as connector configuration document 504). In one embodiment, a link document includes: either an "import" connector document reference (the link document is then called an "in" Link); or an "export" connector document reference (the link document is then called an "out" Link); or both an "import" and an "export" connector document references (the link document is just called "Link" in this case). If a link document is an "in" link, then there is an associated "out" link to write the data to a target.

A connector configuration document 504 includes connector specific configuration information. The base type "Connector" contains enough sections for any connector to specify its configuration information, however, a particular connector may require a more structured way of declaring its configuration, and can do that by deriving from the base "Connector" type.

Transformation document 506 includes transformation related information. Transformation document 506 may specify a source schema, a target schema, and the transformation mechanism, such as XSLT, for instances of the source schema to be transformed into the instances of the target schema.

Figure 7:
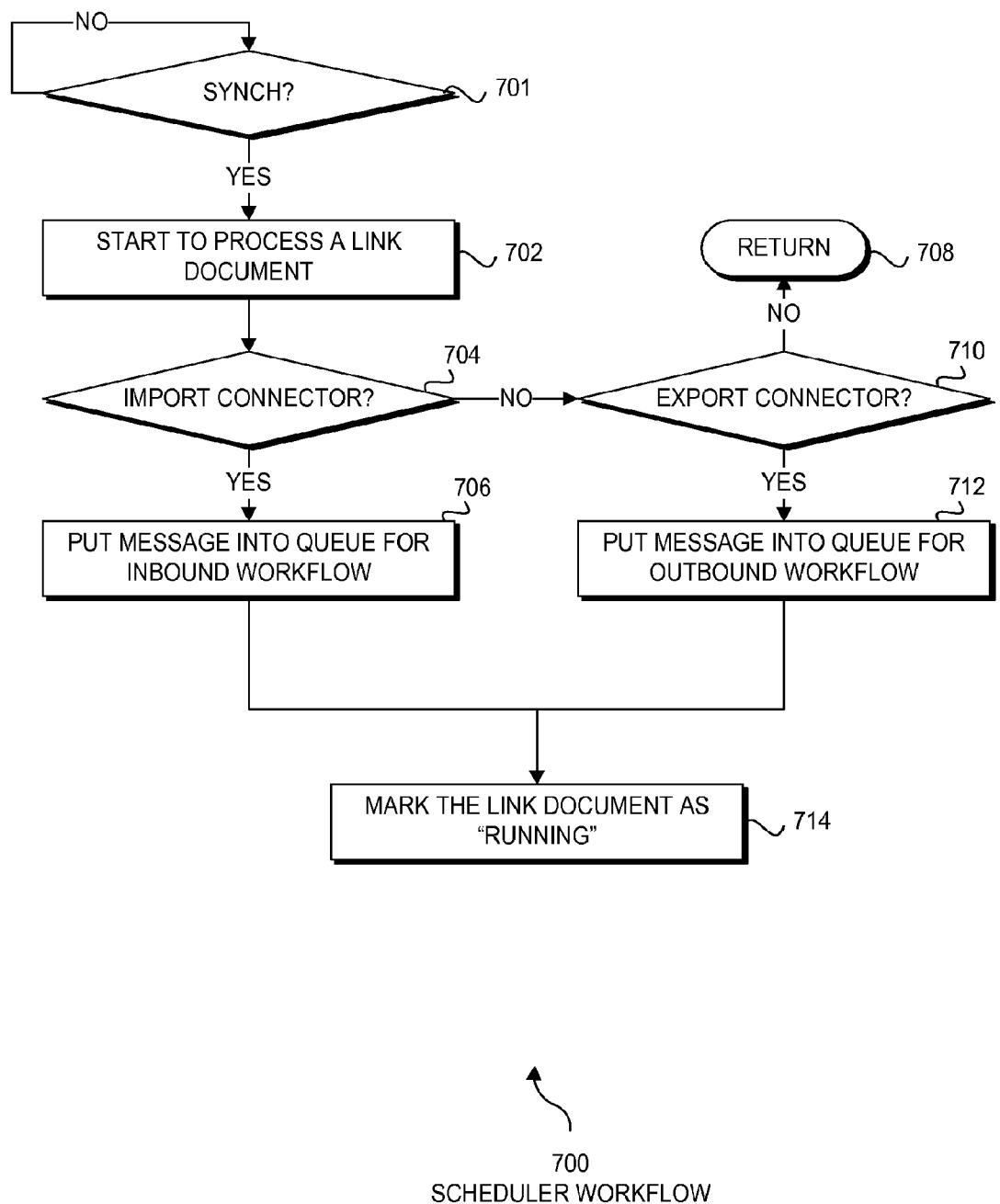
FIG. 7 is a flowchart showing the operations of a scheduler workflow in accordance with an embodiment of the invention.

Turning to FIG. 7, a flowchart 700 shows operations of scheduler workflow 404 in accordance with an embodiment of the invention. In one embodiment, at least a portion of flowchart 700 may be implemented by computer readable instructions executable by one or more computing devices.

In one embodiment, scheduler workflow 404 is a timer based workflow where it is triggered periodically to watch for link document instances created by configuration workflow 402. In one embodiment, the timer is set to watch for new link documents every one minute, but this time period is configurable.

Duties of scheduler workflow 404 may include the following: query all "Active" link documents to check if they need to be synchronized, maintain the state transitions of the link documents, and maintain the dependencies of the link documents. As described below, scheduler workflow 404 places messages in queue 405 to initiate synchronization activity by the inbound/outbound workflows as defined in the configuration document.

Referring to flowchart 700, scheduler workflow 404 queries all Active link documents to determine if any are ready to be synchronized (operation 701). If any Active link documents are ready to be synched, then the logic starts to process a link document (operation 702). In one embodiment, a link document is ready to be synchronized if the next synchronization date of the link document is smaller than or equal to "now" and there are no dependencies to other link documents; and the next synchronization date of the link document is smaller than or equal to "now" and all the dependent link documents have already been synchronized in this batch.

Scheduler workflow 404 duties may include retrieving all the import and export connector assemblies specified in the link document in process. Connectors are configured using the connector configuration documents referenced in the link document. In one embodiment, connector assembly information may be in the connector configuration documents.

If there's an import connector configuration document reference (operation 704), scheduler workflow 404 will put an inbound workflow message into queue 405 to trigger inbound workflow 406 (operation 706). If the concurrent batch count is more than one, then scheduler workflow 404 will put as many of the same inbound workflow message into queue 405 as the concurrent batch count. Embodiments of operations of inbound workflow 406 are discussed below in conjunction with FIG. 8.

The concurrent batch count indicates the number of inbound workflows associated with a data synchronization that may be executed at the same time. Each inbound workflow instance has an associated import connector instance. The concurrent batch count is defined for each data synchronization task by the configuration document. For example, if the concurrent batch count is 3, then 3 messages are put into queue 405. Three inbound workflows (and three import connectors) may then import data as defined by the configuration document. The three inbound workflows may be executed in parallel using multiple processors, multiple cores, multiple servers, etc. A concurrent batch count may be used in a similar fashion for outbound workflows.

If there's an export connector configuration document reference (operation 710), scheduler workflow 404 puts an outbound workflow message into queue 405 to trigger the outbound workflow (operation 712). If the concurrent batch count is more than one, then scheduler workflow 404 puts as many of the same messages into the queue as the concurrent batch count. Embodiments of operations of an outbound workflow 408 are discussed below in conjunction with FIG. 9.

If there are no import or export connector references in the link document, then flowchart 700 returns (operation 708).

Once a message associated with the link document has been put in queue 405, then scheduler workflow 404 marks the link document as in a Running state (operation 714). As described above, a Running state indicates the link document is currently being processed by the linking framework.

Figure 8:
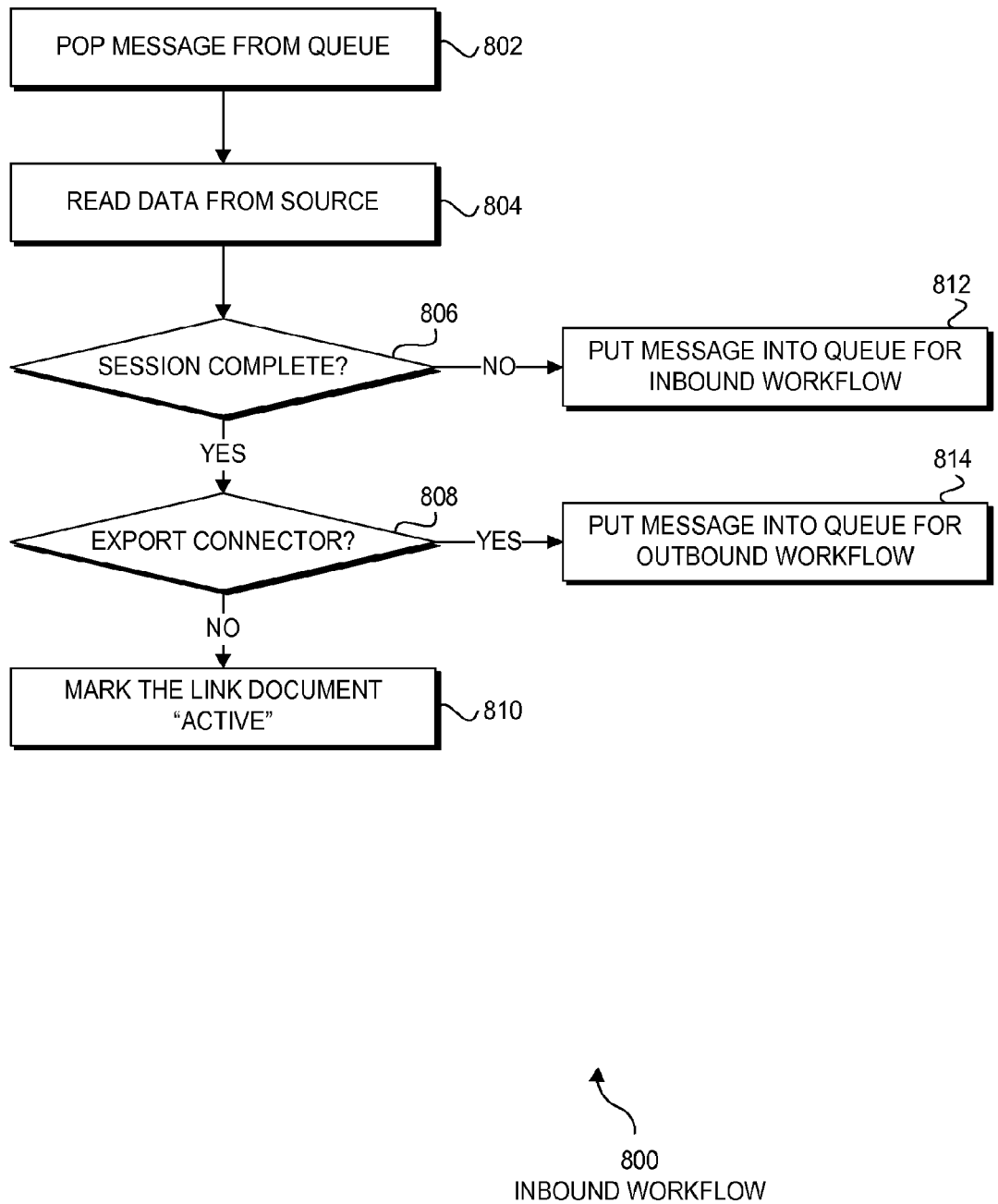
FIG. 8 is a flowchart showing the operations of an inbound workflow in accordance with an embodiment of the invention.

Turning to FIG. 8, a flowchart 800 shows operations of inbound workflow 406 in accordance with an embodiment of the invention. In one embodiment, at least a portion of flowchart 800 may be implemented by computer readable instructions executable by one or more computing devices.

An inbound workflow 406 runs the specified connector referenced in the link document that caused scheduler workflow 404 to initiate the inbound workflow 406. In one embodiment, every time an inbound workflow 406 is triggered, the operations of flowchart 800 are performed.

An inbound workflow message is popped from queue 405 (operation 802). Data referenced by the inbound workflow message is read from the defined source using an import connector and put in staging database 219 (operation 804). In one embodiment, the import connector must have the appropriate credentials as provided in the DataSource document to access and read data from the source. In one embodiment, one batch of data is read in a batch size as defined in the configuration document.

Next, the logic determines if the session is complete (operation 806). In one embodiment, a session is complete when all the data associated with that link document has been read from the sources. If the session is not complete, then a single message is put back into queue 405 which is the same message that caused inbound workflow 406 to be triggered (operation 812). Inbound workflow 406 is responsible for recycling its own messages until the session completes. It will be appreciated that messages associated with other configuration documents may already be queue 405. Queue 405 may hold interspersed messages associated with multiple configuration documents (and thus different synchronization activities).

If the session is complete, then it is determined if an outbound workflow is specified in the link document (operation 808). If outbound workflow is specified, as many outbound workflow messages are put into the outbound workflow queue as specified in the concurrent batch count (operation 814). If there is no export connector specified, then the link document is marked as "Active" (the link document had been marked as "Running" by the scheduler workflow 404) and flowchart 800 ends (operation 810). An Active state indicates the link document is ready to be processed by the linking framework.

Figure 9:
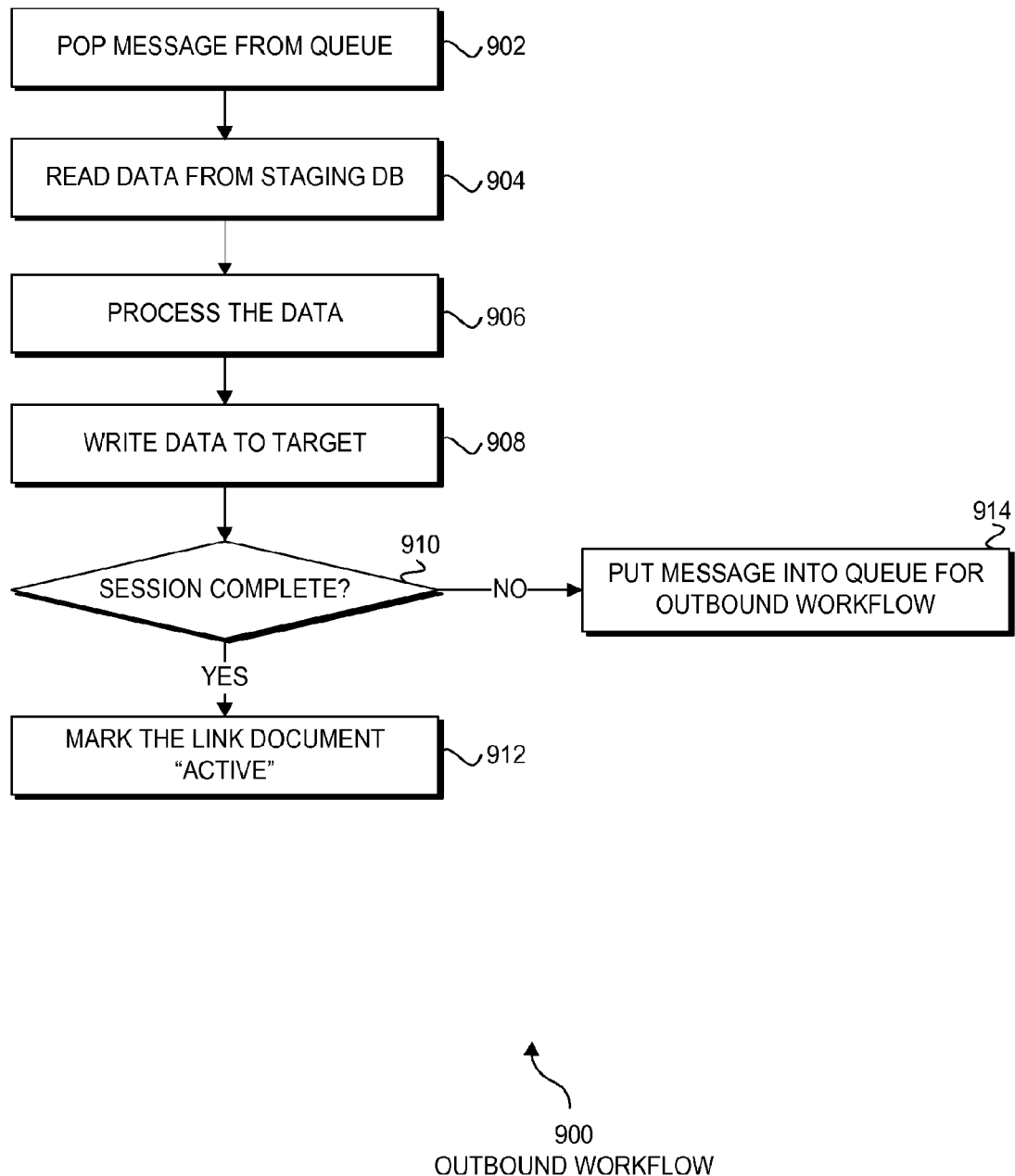
FIG. 9 is a flowchart showing the operations of an outbound workflow in accordance with an embodiment of the invention.

Turning to FIG. 9, a flowchart 900 shows operations of outbound workflow 408 in accordance with an embodiment of the invention. In one embodiment, at least a portion of flowchart 900 may be implemented by computer readable instructions executable by one or more computing devices.

Outbound workflow 408 runs the specified export connector referenced in the link document that caused scheduler workflow 404 to initiate outbound workflow 408. In one embodiment, every time outbound workflow 408 gets triggered it performs the logic of flowchart 900.

Starting in operation 902, an outbound workflow message is popped from queue 405. A batch of data (batch size defined by configuration document) associated with the message is retrieved from staging database 219 (operation 904) and passed to export connector 412 to process the data (operation 906). Processing the data may include a transform, join, confliction resolution, and the like. Next, the batch of data is written to the target by the export connector (operation 908). Next, the logic determines if the session is complete (i.e., all the data has been written to the target) (operation 910). If the session is complete, then the link document is marked as "Active" and the workflow returns (operation 912).

If the session is not complete, a message is put back into queue 405 which is the same message that caused outbound workflow 408 to be triggered (operation 914) and the workflow returns. It will be appreciated that messages associated with other configuration documents may already be in queue 405. Each outbound workflow 408 is responsible for recycling its own messages until the associated data in staging database 219 is written to the target.

Figure 10A:
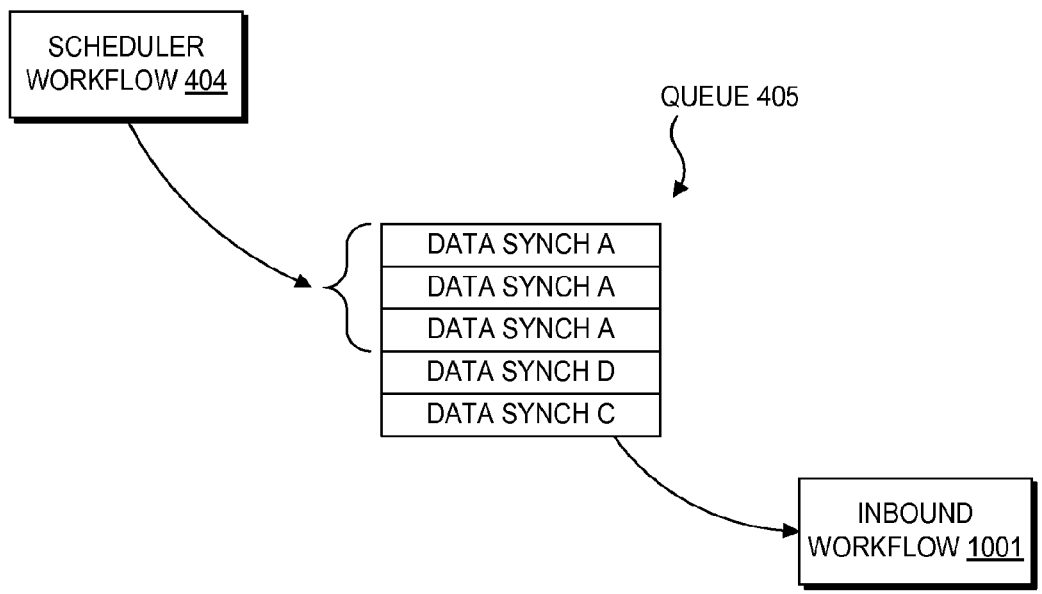
FIGS. 10A-D are block diagrams of data synchronization operations using a message queue in accordance with embodiments of the invention.

Turning to FIGS. 10A-10D, an example sequence of data synchronization operations using queue 405 is shown. In FIG. 10A, queue 405 has messages for a data synchronization task C and a data synchronization task D. Scheduler workflow 404 adds three new messages to queue 405 for data synchronization task A since data synchronization task A has a batch count of 3. Also in FIG. 10A, a message for data synchronization task C is being pulled from the queue and sent to inbound workflow 1001 for processing.

Figure 10B:
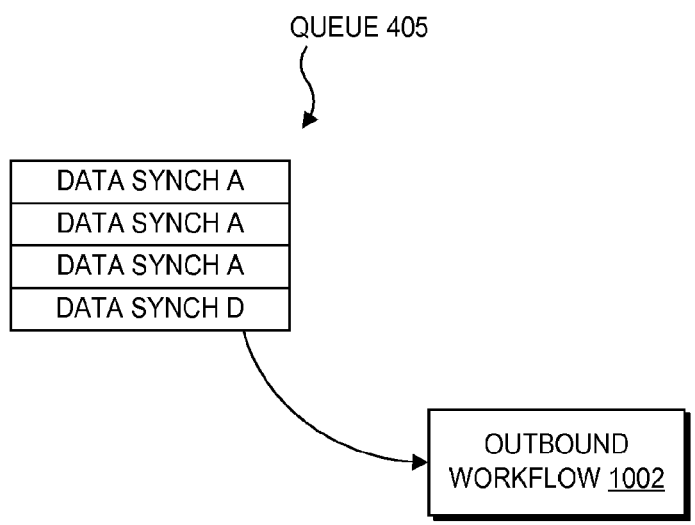

In FIG. 10B, a message for data synchronization task D is being popped from the queue and sent to outbound workflow 1002 for processing. From FIG. 10B it will be appreciated that messages for both inbound and outbound workflows are placed in queue 405.

Figure 10C:
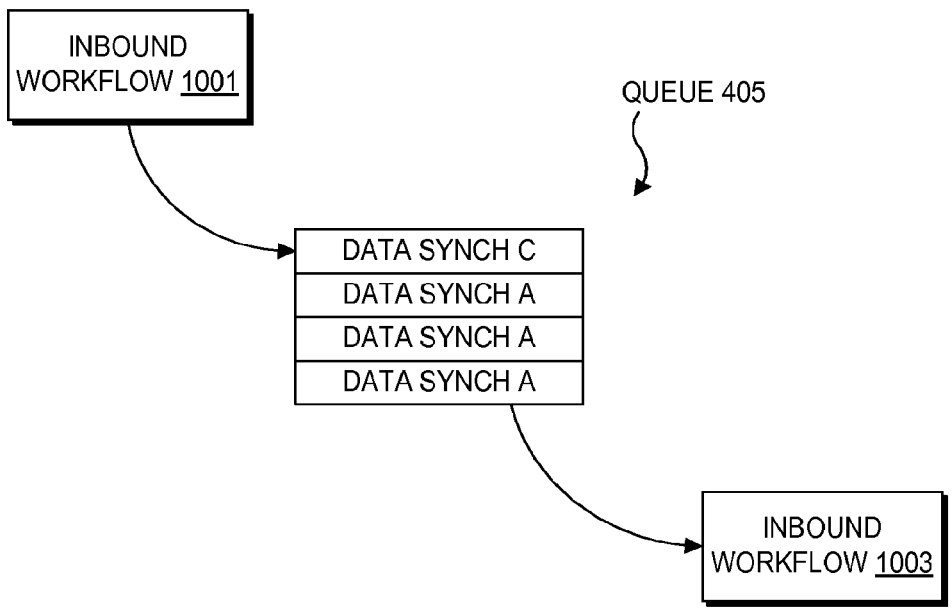

In FIG. 10C, a message for data synchronization task A is popped from queue 405 and sent to inbound workflow 1003 for processing. Also, inbound workflow 1001 from FIG. 10A has placed the message for data synchronization task C back into queue 405. The session for data synchronization task C did not complete, so the message is recycled.

Figure 10D:
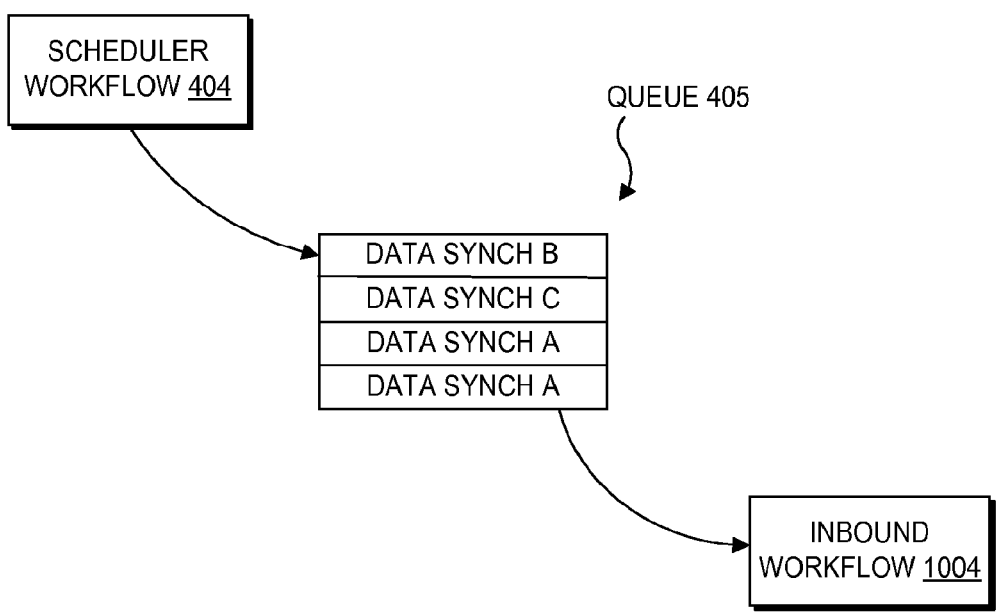

In FIG. 10D, a message for data synchronization task B is put into queue 405 by scheduler workflow 404. Also, another message for data synchronization task A is pulled from queue 405 for processing by inbound workflow 1004. Thus, at this point, two inbound workflows are processing data for data synchronization task A. These inbound workflows may work concurrently (i.e., in parallel) if sufficient computing resources are available (e.g., two servers).

Embodiments of the invention provide a declarative, extensible linking framework for data synchronization for IT management. Embodiments of the invention allow a user to create and modify data synchronization processes through declarative expression instead of coding. A user, such as a system administrator, may easily make changes to processes through manipulating configuration documents (implemented as configuration objects) instead of coding or scripting. Administrators often wish to insert new logic during (or before and after) the linking activity, per object, per batch or per session, without writing code. Also, embodiments herein enable an administrator to make processes specific for a data type.

Linking activities can get very complex with many incoming and outgoing links, each requiring its own configuration (e.g., schedule, batch size, reconciliation policies, transformations, credential requirements, etc.). Writing code or running scripts to set up and update data linking processes is not manageable. Embodiments herein provide an environment in which a user may implement various linking processes without the burden of drafting code. Also, the declarative nature of linking framework 102 provides consistency across linking processes and avoids the problems of multiple administrators each writing linking process code in their own style or creating bugs through "copy/paste" of previous code.

Using declarative configuration documents also eases the authoring of data synchronization tasks for the user. Synchronizing data may require multiple actions that must occur in a proper order to avoid data conflict. Linking framework 102 may automatically resolve conflicts for the user, such as through conflict module 216.

Embodiments of linking framework 102 are extensible. The declarative nature of linking framework 102 enables a user to easily setup a synchronizing task for new data types and new ways of processing these data types without changing the linking framework. The user merely sets up a new configuration document. Linking framework 102 also may be extended to new workflows using a solution pack.

Embodiments of the invention may provide system resiliency and hence data reliability. In some instances, a process can run for a long period of time with the cooperation of many systems. Network outages, temporary security glitches (like expired credentials) or system failures may occur. Sometimes the linking framework does not get access to all partner systems having sources and targets at the same time. Embodiments of the invention can work through all these issues without having to restart the processing from the beginning. Any system failure or transaction failure does not result in missing, malformed or duplicate data. Data is gathered from the source and persisted to the target in such a way that an interrupted read from source/write to target may be resumed from where the interruption occurred instead of restarting the process. In one embodiment, a batch style of reading/writing data from the source/target stores provides this data resiliency and efficiency. Batching provides: faster recovery on errors since interrupted reading/writing does not have to be restarted, parallel processing since different data groups may be read/write at the same time, grouping of data in keeping with available resources, and minimization of the impact of data locks at sources and targets since only a portion of data (i.e., a single batch) is locked at a time.

Embodiments of the invention lessen impact on systems providing sources and targets. The partner systems themselves are operational systems which require most of their resources dedicated to their function (monitoring, deployment, etc). Embodiments of the linking framework do not put undue burden on these source and target endpoints because the extraction and insertion of data may be throttled to accommodate the source and target stores at either end.

Linking framework 102 provides reliability for recovering from an exception. Linking framework workflows may throw two types of exceptions: Recoverable Exceptions and Non-recoverable Exceptions. Linking Framework 102 will retry running a particular workflow if a thrown exception is a Recoverable Exception. For a Non-recoverable Exception, corresponding entries are logged in an event viewer as well as Built-In Diagnostic (BID) tracing when BID tracing is enabled.

In one embodiment, the failure of a particular data synchronization will stop the execution of the synchronization until the problem is fixed (e.g., network problems, wrong XSLT, etc.). During this down period, every synchronization that depends on the failed synchronization will come to a halt as well to avoid wasting resources. Otherwise, the linking framework may perform an erroneous or an unproductive synch operation since the data needed for the synch is not yet available.

In one embodiment, scheduler workflow 404 may determine how long a particular synchronization is in a bad state and place messages in an event log to notify a system administrator. In yet another embodiment, an alert for the system administrator's attention is also produced.

In one embodiment, if a computing device executing a workflow fails or if a workflow encounters an issue which requires manual intervention, no data loss will happen since the data retrieval process is done by acknowledgement. When the workflows resume, they may continue synchronizing data from where they left off. In other words, an inbound workflow does not have to start a synchronization over from the beginning when the inbound workflow resumes. However, if the source data is provided to the linking framework via streaming, then the streamed content may be lost and the synchronization will have to restart from the beginning.

Linking framework 102 provides various security mechanisms. For example, workflows, such as inbound, outbound, and configuration, may access DataSource documents for credential information specific to a data source and connection details for a specific data source. Connectors will be run under the credentials specified in those DataSource documents. Since the connection details are specific to each connector, connectors use this information to connect to a source.

Performance of linking framework 102 may be impacted by a particular connector implementation, data source system load, and the batch size and concurrent batch count. Each workflow will be independently working on a separate batch of data if a concurrent batch count of more than one is specified. The batch size, concurrent batch count and all performance related configuration data may be tweaked per source/target system and per type in that source/target system to enable the optimum performance throughout the linking framework.

There is no inherent limit on the number or size of the instances that are being retrieved or written from or to an external system. However, throttling of synchronization, so as to not overwhelm a source or target store, may be used. A limit may be imposed by various factors including data source limits (e.g., operations manager 106 or configuration manager 108), number of cascaded workflow hosts (i.e., scale out scenario), and/or data target limits (e.g., CMDB 110, DW 112).

Other techniques may be used with embodiments of the invention to increase performance of linking framework 102. Watermarking of data (e.g., based on last change time stamp, a history table, etc.) may be used so that only changes in data are synched, and thus, decrease the impact on all resources. For example, keeping track of the last record transferred allows the linking framework to resume from where the synch left off. This saves a lot of time as compared to constantly recognizing that the record that is about to be transferred from the source is already present at the target.

Caching may be used when obtaining data from a source so that the linking framework does not have to ask for the same data multiple times. For example, sometimes the same data read from a source needs to be joined with multiple different pieces of data on one or more synchronization jobs again and again to create different output data. Fetching that common data every time from the source can be avoided by keeping a copy of the data at a linking framework cache (such as staging database 219).

Parallelism may be used to affect data processing using multiple servers. Batches synchronized by different servers (or different processes on the same server) improves synch time and provides resiliency. For example, if a server fails during data read/write at a source/target, then the remaining servers may pick up the batches of the failed server.

Figure 11:
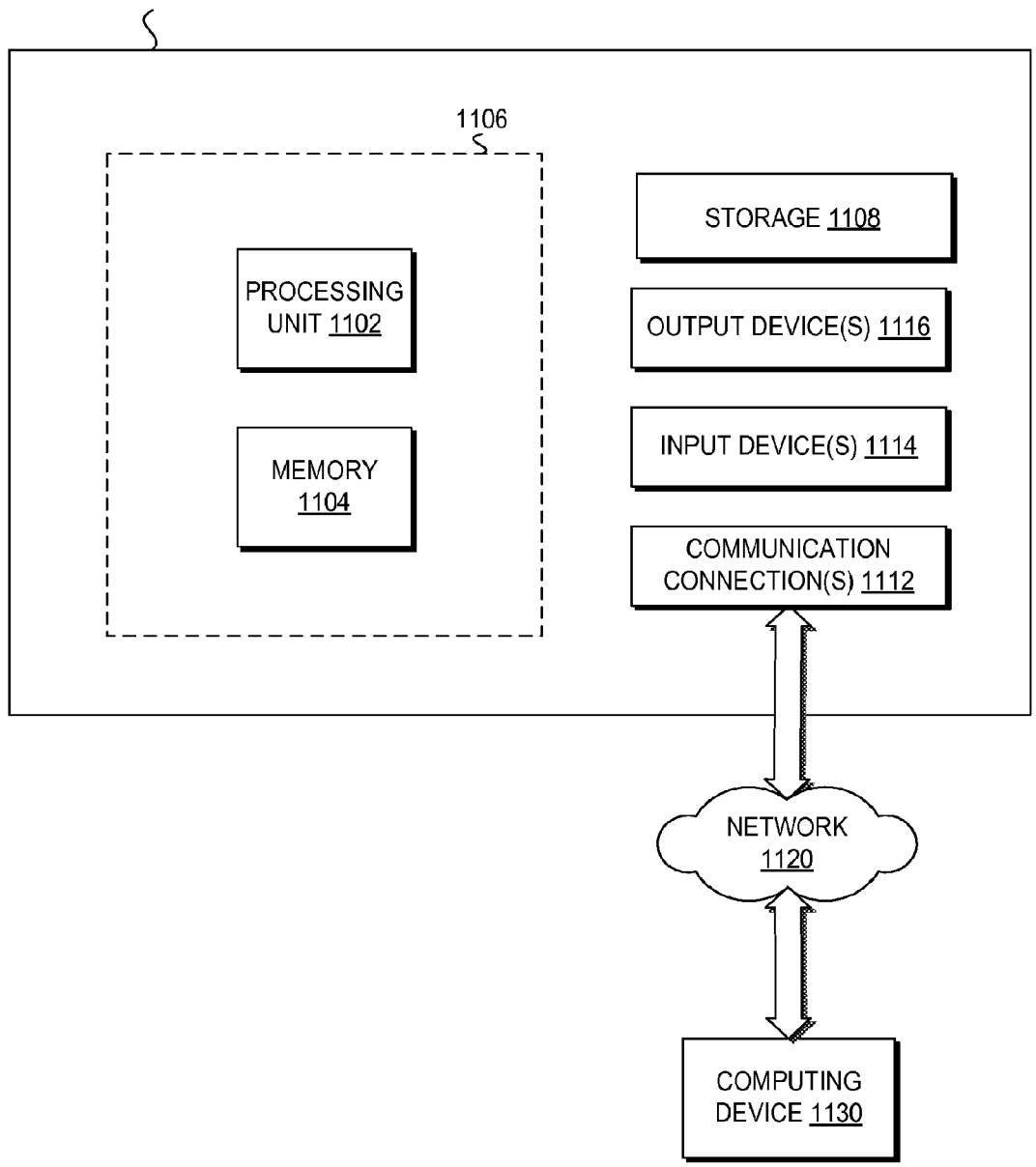
FIG. 11 is a block diagram of an example computing device for implementing embodiments of the invention.

FIG. 11 and the following discussion provide a brief, general description of a suitable computing environment to implement embodiments of the invention. The operating environment of FIG. 11 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 shows an example of a computing device 1100 for implementing one or more embodiments of the invention. In one configuration, computing device 1100 includes at least one processing unit 1102 and memory 1104. Depending on the exact configuration and type of computing device, memory 1104 may be volatile (such as RAM), non-volatile (such as ROM, flash memory, etc.) or some combination of the two. This configuration is illustrated in FIG. 11 by dashed line 1106.

In other embodiments, device 1100 may include additional features and/or functionality. For example, device 1100 may also include additional storage (e.g., removable and/or non-removable) including, but not limited to, magnetic storage, optical storage, and the like. Such additional storage is illustrated in FIG. 11 by storage 1108. In one embodiment, computer readable instructions to implement embodiments of the invention may be in storage 1108. Storage 1108 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 1104 and storage 1108 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1100. Any such computer storage media may be part of device 1100.

Device 1100 may also include communication connection(s) 1112 that allow device 1100 to communicate with other devices. Communication connection(s) 1112 may include, but is not limited to, a modem, a Network Interface Card (NIC), an integrated network interface, a radio frequency transmitter/receiver, an infrared port, a USB connection, or other interfaces for connecting computing device 1100 to other computing devices. Communication connection(s) 1112 may include a wired connection or a wireless connection. Communication connection(s) 1112 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 1100 may include input device(s) 114 such as keyboard, mouse, pen, voice input device, touch input device, infrared cameras, video input devices, and/or any other input device. Output device(s) 1116 such as one or more displays, speakers, printers, and/or any other output device may also be included in device 1100. Input device(s) 1114 and output device(s) 1116 may be connected to device 1100 via a wired connection, wireless connection, or any combination thereof. In one embodiment, an input device or an output device from another computing device may be used as input device(s) 1114 or output device(s) 1116 for computing device 1100.

Components of computing device 1100 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1100 may be interconnected by a network. For example, memory 1104 may be comprised of multiple physical memory units located in different physical locations interconnected by a network.

In the description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Those skilled in the art will realize that storage devices utilized to store computer readable instructions may be distributed across a network. For example, a computing device 1130 accessible via network 1120 may store computer readable instructions to implement one or more embodiments of the invention. Computing device 1100 may access computing device 1130 and download a part or all of the computer readable instructions for execution. Alternatively, computing device 1100 may download pieces of the computer readable instructions, as needed, or some instructions may be executed at computing device 1100 and some at computing device 1130. Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A computing device comprising:
   at least one processor;
   memory coupled to the at least one processor;
   an inbound workflow implemented at least in part by the at least one processor and via which at least one import connector is configured as described by a configuration document;
   an outbound workflow implemented at least in part by the at least one processor and via which an export connector is configured as described by the configuration document;
   the at least one import connector configured to import, as defined by the configuration document, data;
   the export connector configured to retrieve, as defined by the configuration document, the imported data;
   at least one transform module of the export connector configured to transform, as defined by the configuration document, the retrieved data from formats of the imported data to a format associated with a target;
   a join module of the export connector configured to join, as defined by the configuration document, the transformed data; and
   a conflict module of the export connector configured to perform, as defined by the configuration document, conflict resolution on the joined data, where the conflict resolution comprises reconciling any conflicts between the data imported by each of the at least one import connector, and where the conflict-resolved data can be traced back to a source.

2. The computing device of claim 1 where the at least one import connector includes a trigger configured to indicate when the at least one input connector is to import at least a portion of the data from a corresponding source.

3. The computing device of claim 1 where the at least one transform module is configured to transform the retrieved data as required by the target.

4. The computing device of claim 1 where the at least one transform module is further configured to transform the retrieved data to conform to a common schema.

5. The computing device of claim 1 where the join module is configured to join the transformed data after waiting for the transformed data to become available from each of the at least one transform module.

6. A method performed on a computing device, the method comprising:
   configuring, via an inbound workflow, at least one import connector as described by a configuration document;
   configuring, via an outbound workflow, an export connector as described by a configuration document;
   importing, via the at least one import connector as defined by the configuration document, data;
   retrieving, via the export connector as defined by the configuration document, the imported data;
   transforming, as defined by the configuration document, the retrieved data from formats of the imported data to a format associated with a target;
   joining, as defined by the configuration document, the transformed data; and
   performing, as defined by the configuration document, conflict resolution on the joined data, where the conflict resolution comprises reconciling any conflicts between the data imported by each of the at least one import connector, and where the conflict-resolved data can be traced back to a source.

7. The method of claim 6 where the at least one import connector includes a trigger configured for indicating when the at least one input connector is to import at least a portion of the data from a corresponding source.

8. The method of claim 6 where the export connector comprises a transform module configured for performing the transforming, a join module configured for performing the joining, and a conflict module configured for performing the conflict resolution.

9. The method of claim 6 where the transforming comprises conforming the imported data to a common schema.

10. The method of claim 6 where the joining comprises waiting for at least a portion of the data to become available for the importing and transforming.

11. At least one memory storage device storing computer-executable instructions that, based on execution by a computing device that comprises memory, configure the computing device to perform actions comprising:
    configuring, via an inbound workflow, at least one import connector as described by a configuration document;
    configuring, via an outbound workflow, an export connector as described by a configuration document;
    importing, via the at least one import connector as defined by the configuration document, data into the memory;
    retrieving, via the export connector as defined by the configuration document, the imported data;
    transforming, as defined by the configuration document, the retrieved data from formats of the imported data to a format associated with a target;
    joining, as defined by the configuration document, the transformed data; and
    performing, as defined by the configuration document, conflict resolution on the joined data, where the conflict resolution comprises reconciling any conflicts between the data imported by each of the at least one import connector, and where the conflict-resolved data can be traced back to a source.

12. The at least one memory storage device of claim 11 where the at least one import connector includes a trigger configured for indicating when the at least one input connector is to import at least a portion of the data from a corresponding source.

13. The at least one memory storage device of claim 11 where the export connector comprises a transform module configured for performing the transforming, a join module configured for performing the joining, and a conflict module configured for performing the conflict resolution.

14. The at least one memory storage device of claim 11 where the transforming comprises conforming the imported data to a common schema.

15. The at least one memory storage device of claim 11 where the joining comprises waiting for at least a portion of the data to become available for the importing and transforming.

* * * * *